United States Patent

Chang

[11] Patent Number: 6,146,195
[45] Date of Patent: Nov. 14, 2000

[54] STACKED SMART CARD CONNECTOR ASSEMBLY

[75] Inventor: Yao-Hao Chang, Tu-Chen, Taiwan

[73] Assignee: Hon Hai Precision Ind. Co., Ltd., Taipei Hsien, Taiwan

[21] Appl. No.: 09/377,665

[22] Filed: Aug. 19, 1999

[30] Foreign Application Priority Data

Dec. 18, 1998 [TW] Taiwan .................................. 87221140

[51] Int. Cl.⁷ .................................................. H01R 23/70
[52] U.S. Cl. .......................... 439/541.5; 439/74; 439/630
[58] Field of Search .................................. 439/541.5, 64, 439/701, 76.1, 67, 77, 74, 630

[56] References Cited

U.S. PATENT DOCUMENTS

| | | | |
|---|---|---|---|
| 5,013,255 | 5/1991 | Juret et al. | 439/260 |
| 5,080,609 | 1/1992 | Fabian et al. | 439/541.5 |
| 5,226,826 | 7/1993 | Nillson et al. | 439/72 |
| 5,520,551 | 5/1996 | Broschard, III | 439/567 |
| 5,876,218 | 3/1999 | Liebenow et al. | 439/74 |
| 5,967,803 | 10/1999 | Ho | 439/541.5 |

*Primary Examiner*—Gary F. Paumen
*Attorney, Agent, or Firm*—Wei Te Chung

[57] ABSTRACT

A stacked smart card connector assembly for interconnecting inserted smart cards to a mother board comprises an upper smart card connector and a lower smart card connector fastened together, an intermediate circuit board retained between the two connectors, a transition connector connected to the intermediate circuit board, and a pair of bolts for fastening the upper and lower connectors together. The upper connector is connected to the mother board via the intermediate circuit board and the transition connector is mounted to the mother board. The upper connector is supported on the lower connector by two pairs of protrusions formed on an upper surface of the lower connector and is secured to the lower connector to form a stacked connector assembly by the bolts. The stacked smart card connector assembly is formed by vertically securing two single smart card connectors together with little modification for promoting mass production and facilitating assembly.

10 Claims, 5 Drawing Sheets

STACKED SMART CARD CONNECTOR ASSEMBLY

BACKGROUND OF THE INVENTION

The present invention relates to a stacked smart card connector assembly which occupies a limited space on a mother board to which the connector assembly is mounted, and which is easily manufactured and assembled.

DESCRIPTION OF PRIOR ART

Smart cards of reduced size are becoming increasingly popular for use in devices having a small dimension such as mobile telephones, notebook computers and digital cameras. The smart card contains an integrated circuit typically in the form of a memory circuit, such as RAM (random access memory) and ROM (read only memory). The smart card normally includes conductive pads for engaging with a card reader or a card connector to electrically connect with a mother board. The smart card connector usually comprises an insulative housing having a slot into which the card is inserted, and a plurality of contacts extending into the slot. Each contact comprises a contact portion for contacting the conductive pads of the inserted smart card, and a solder portion downwardly extending from the housing for connecting to the mother board. U.S. Pat. Nos. 5,013,255; 5,226,826 and 5,520,551 disclose pertinent designs.

However, since the conventional smart card connector can only accommodate one smart card, the demand for an increase in data storage capacity of personal computers cannot be met. To simultaneously use the information stored in several smart cards, several conventional smart card connectors must be mounted to the mother board. Thus, a significant amount of space will be occupied on the mother board, which is out of line with current miniaturization trends in the development of personal computers. Furthermore, when mounting several conventional smart card connectors to the circuit board, assembly and soldering operations must be repeated several times thereby increasing assembly costs. Accordingly, a stacked smart card connector assembly for accommodating several smart cards is requisite.

SUMMARY OF THE INVENTION

Accordingly, one object of the present invention is to provide a stacked smart card connector assembly for receiving more than one smart card to reduce occupied space on a mother board.

Another object of the present invention is to provide a stacked smart card connector assembly assembled by vertically attaching two conventional smart card connectors with little modification thereby promoting mass production and reducing production costs.

A further object of the present invention is to provide a stacked smart card connector assembly which is easily assembled and adjustable in height for expanding the adaptability thereof.

In order to achieve the objects set forth, a stacked smart card connector assembly in accordance with the present invention comprises an upper smart card connector and a lower smart card connector attached together, an intermediate circuit board retained between the upper and lower smart card connectors, a transition connector connected to the intermediate circuit board and a pair of bolts for fastening the upper and lower connectors together. Each of the upper and lower connectors comprises a cover and a base fastened together with a slot defined therebetween for receiving a smart card, and a plurality of grooves disposed in the base retaining a plurality of contacts for connecting with conductive pads on the inserted smart card.

A pair of mounting posts integrally extends from a bottom surface of the base of each of the upper and lower connectors proximate each lateral side thereof. A pair of protrusions is formed on an upper surface of the lower connector proximate each lateral side thereof. Each protrusion forms a cavity for engaging with the corresponding mounting post of the upper connector thereby attaching the upper connector to the lower connector whereby a space is defined therebetween.

Most of the intermediate circuit board with solder portions of the contacts of the upper connector connected thereto is retained in the space and the remainder extends therefrom with the transition connector mounted thereto. The transition connector is mounted to a mother board thereby connecting the upper connector to the mother board via the intermediate circuit board. A pair of locking holes is formed through each of the upper and lower connectors for the extension of the bolts therethrough thereby retentively fastening the upper and lower connectors together. The space defined between the upper and lower connectors is adjustable by selecting the bolts of desired length.

Other objects, advantages and novel features of the invention will become more apparent from the following detailed description when taken in conjunction with the accompanying drawings.

DETAILED DESCRIPTION OF THE EMBODIMENTS

Figure 1:
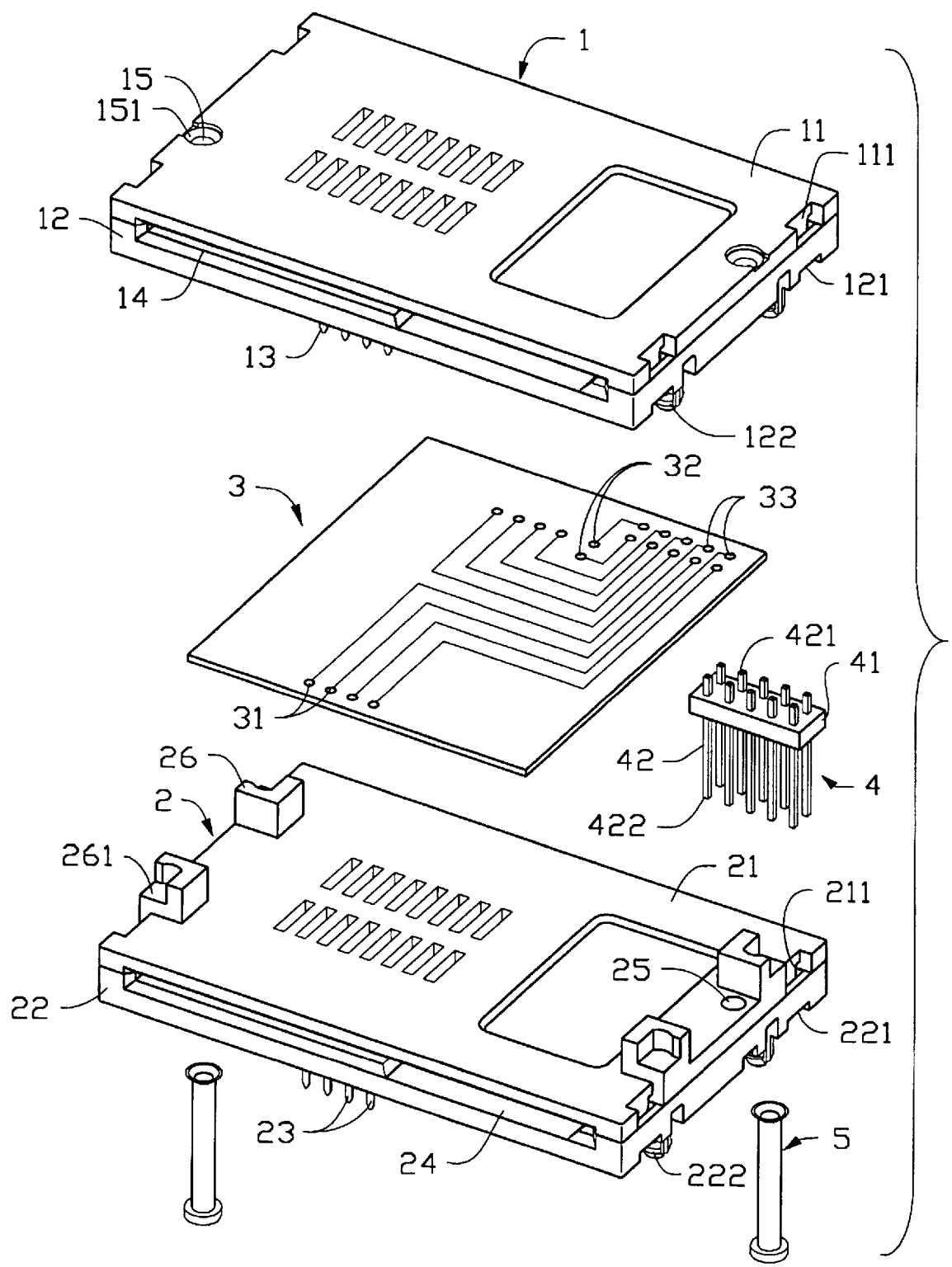
FIG. 1 is an exploded view of a stacked smart card connector assembly in accordance with a first embodiment of the present invention.

Referring to FIG. 1, a stacked smart card connector assembly in accordance with a first embodiment of the present invention comprises an upper smart card connector 1, a lower smart card connector 2, a transition device in the form of an intermediate circuit board 3, a transition connector in the form of a header connector 4 and an engaging with device in the form of a pair of bolts 5. The upper connector 1 comprises a housing cover 11 and a housing base 12 attached together. A slot (not labeled) is defined between the cover 11 and the base 12 for receiving a smart card (not shown). An opening 14 is disposed in a longitudinal side of the upper connector 1 in communication with the slot for insertion of the smart card into the slot. Two pairs of mounting posts 122 integrally extend from bottom sides of the upper connector 1 for attaching the upper connector 1 to the lower connector 2.

Figure 3:
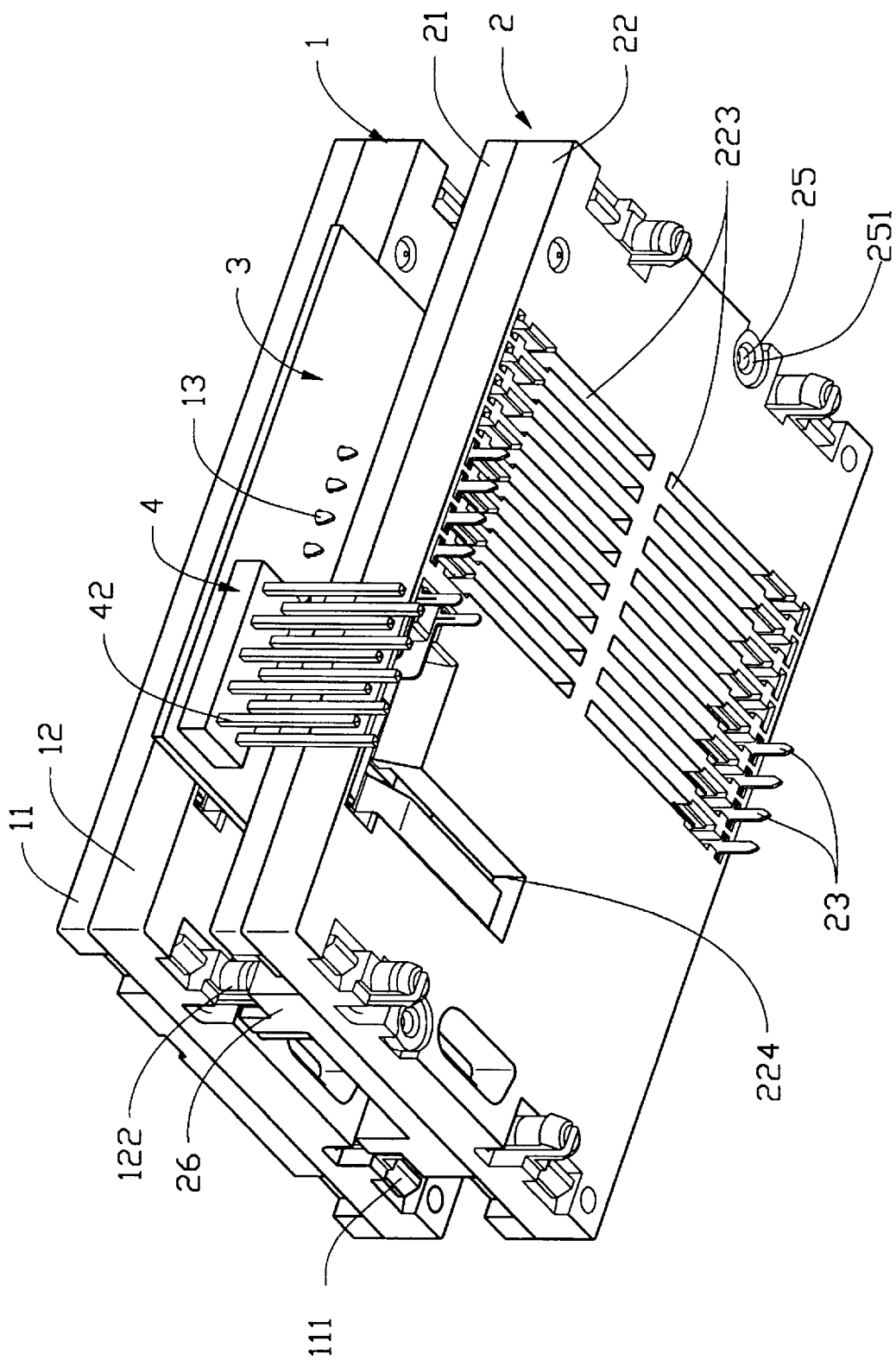
FIG. 3 is a bottom surface perspective view of FIG. 2.

Also referring to FIG. 3, a plurality of grooves (not shown) arranged in two rows is defined in the base 12 proximate the slot for receiving a plurality of contacts 13 therein. The grooves of the upper connector 1 are identical to grooves 223 of the lower connector 2. In the embodiment shown, eight contacts 13 arranged in two rows are anchored in the corresponding grooves. Four contacts 13 extend from the front of the base 12 and four contacts 13 extend from the rear of the base 12. The contacts 13 are stamped and formed from resilient sheet metal. Each contact 13 includes a contact portion (not shown) extending into the slot for engaging with a corresponding conductive pad of the smart card, and a solder or mounting portion (not labeled) downwardly extending from the base 12 for engaging with the circuit board 3.

A substantially L-shaped channel (not shown) is disposed in a bottom surface of the base 12 and distanced from the opening 14 for receiving a switch device (not shown) which detects full insertion of the smart card. The channel and switch device of the upper connector 1 are identical to a channel 224 and a switch device (not labeled) anchored in the channel 224 of the lower connector 2. A pair of latch hooks 111 downwardly extends from an upper surface of the cover 11 proximate each lateral side for engaging with a pair of corresponding holes 121 disposed in each lateral side of the base 12 thereby securing the cover 11 and the base 12 together.

The lower connector 2 comprises a housing cover 21, a housing base 22 secured to the cover 21, and eight contacts 23 arranged in two rows in the base 22 for engaging with conductive pads of the inserted smart card. An opening 24 is formed in a front longitudinal side of the lower connector 2 in communication with a slot (not labeled) defined between the cover 21 and base 22 for insertion of the smart card into the slot. The contacts 23 are anchored in the corresponding channels 223 defined through the base 22 with solder portions (not labeled) downwardly extending from the base 22 for engaging with corresponding plated through holes formed in the mother board. The cover 21 and the base 22 are secured together by means of latch hooks 211 and corresponding holes 221 in the same manner as the upper connector 1. A pair of mounting posts 222 extends from bottom sides of the lower connector 2 for engaging with corresponding mounting holes formed in a mother board (not shown) thereby mounting the lower connector 2 to the mother board. Since the configuration of the lower connector 2 is similar to the upper connector 1, the same manufacturing process can be employed to facilitate mass production.

The lower connector 2 further comprises a supporting device for supporting the upper connector 1 thereon. The supporting device is in the form of two pairs of protrusions 26 formed on an upper surface of the cover 21. Each pair of protrusions 26 is formed proximate a lateral side of the cover 21 in a symmetrical relationship. Each protrusion 26 forms a cavity 261 in a corner thereof dimensioned to engage with the corresponding mounting post 122 of the upper connector 1 whereby a space is defined between the upper connector 1 and the lower connector 2. The space between the upper and lower connectors 1, 2 is adjustable by a pair of bolts 5 which will be described in detail hereinafter.

Both of the upper and lower connectors 1, 2 comprise a pair of offset locking holes 15, 25 extending therethrough proximate opposite lateral sides thereof, respectively, for the extension of the bolts 5 therethrough. The locking hole 15 of the upper connector 1 comprises an inclined surface 151 proximate the upper surface thereof. The locking hole 25 of the lower connector 2 comprises a spiral surface 251 (FIG. 3) proximate the bottom surface thereof. Opposite ends of each bolt 5 have diameters larger than that of a stem of the bolt 5 corresponding to the inclined surface 151 and the spiral surface 251 of the upper and lower connectors 1, 2. The bolt 5 can be selected from different length available in the market. Therefore, when the upper connector 1 is vertically attached to the lower connector 2, the space therebetween is adjustable by selecting bolts 5 of different lengths, while the mounting posts 122 of the upper connector 1 can still engage with the corresponding cavities 261 of the protrusions 26 of the lower connector 2.

Figure 4:
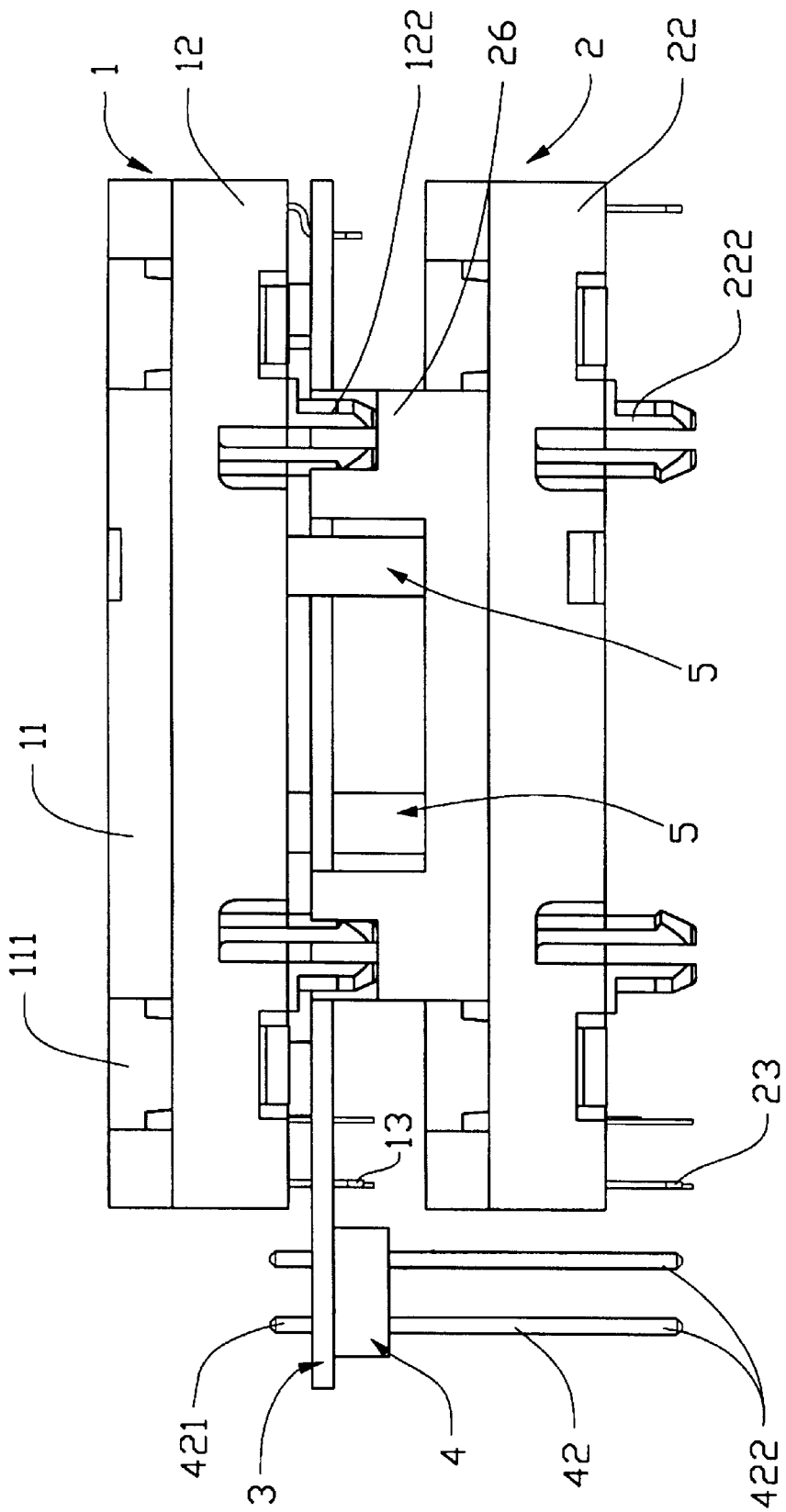
FIG. 4 is a right side view of FIG. 3.

The circuit board 3 comprises eight contact receiving holes 31 arranged in two rows for insertion of the solder portions of the contacts 13 of the upper connector 1, and two apertures 32 for engaging with the switch device. Also referring to FIG. 4, after the solder portions of the contacts 13 are engaged with the corresponding holes 31 and the switch device is engaged with the apertures 32, most of the circuit board 3 is retained in the space defined between the upper and lower connectors 1, 2. The rest of the circuit board 3 having a plurality of pin receiving openings 33 arranged in two rows extends beyond the upper and lower connectors 1, 2 for engaging corresponding pins 42 of the header connector 4. The contact receiving holes 31 and the apertures 32 are connected to the pin receiving openings 33 by circuit paths.

The header connector 4 comprises an insulative header 41 and the pins 42 integrally extend through the header 41. Each pin 42 includes a mating portion 421 for engaging with the corresponding pin receiving openings 33, and an opposite connecting portion 422 downwardly extending from the header 41 for connecting to the mother board. Therefore, the upper connector 1 is connected to the mother board through an electrical path formed by the solder portions of the contacts 13, the circuit paths of the circuit board 3 and the pins 42 of the header connector 4 engaged with each other.

In assembly, the upper connector 1 is engaged with the intermediate circuit board 3 by inserting the contacts 13 thereof into the corresponding contact receiving holes 31, and engaging with the switch device with the apertures 32 of the circuit board 3. The header connector 4 is connected to the circuit board 3 by inserting the mating portions 421 of the pins 42 thereof into the corresponding pin receiving openings 33 of the circuit board 3. The upper connector 1 together with the engaged circuit board 3 and header connector 4 is then lowered onto the lower connector 2 by engaging with the mounting posts 122 thereof with the corresponding cavities 261 of the protrusions 26 of the lower connector 2 whereby a space is defined therebetween to obviate a short circuit from being formed due to improper contact.

Figure 2:
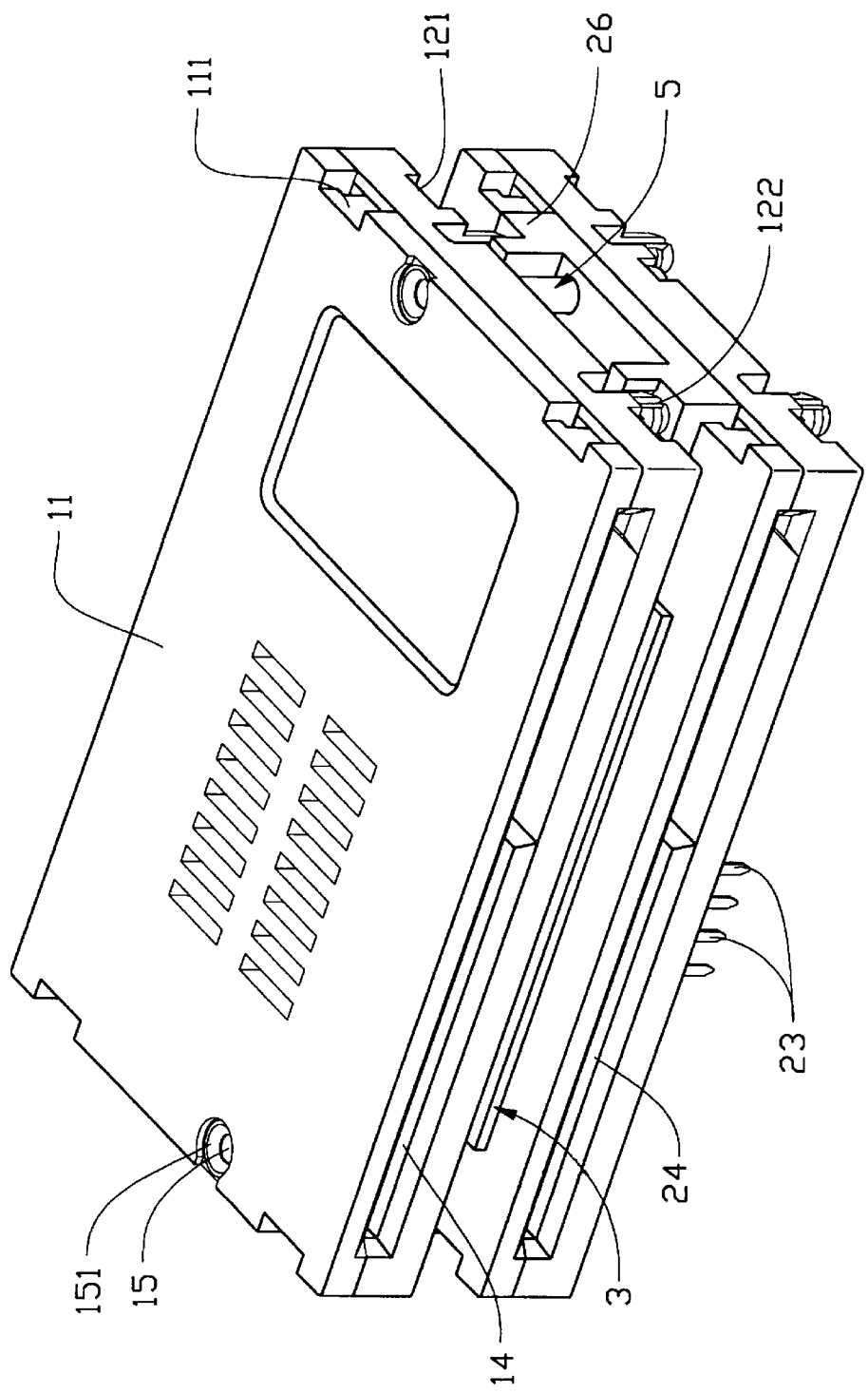
FIG. 2 is an assembled view of FIG. 1.

The bolts 5 extend through the corresponding aligned locking holes 15, 25 of the upper and lower connectors 1, 2 thereby fastening the connectors 1, 2 together to constitute a stacked smart card connector assembly, as shown in FIG. 2. The stacked connector assembly is mounted to the mother board by engaging with the mounting posts 222 of the lower connector 2 with corresponding mounting holes of the mother board. The stacked connector assembly is connected to the mother board by engaging with the connecting portions 422 of the header connector 4 and the contacts 23 of the lower connector 2 with the mother board. Thus, data of one smart card inserted into the upper connector 1 can be effectively transmitted to the mother board via the intermediate circuit board 3 and the header connector 4, while data of another smart card inserted into the lower connector 2 can be directly transmitted to the mother board via the contacts 23.

Figure 5:
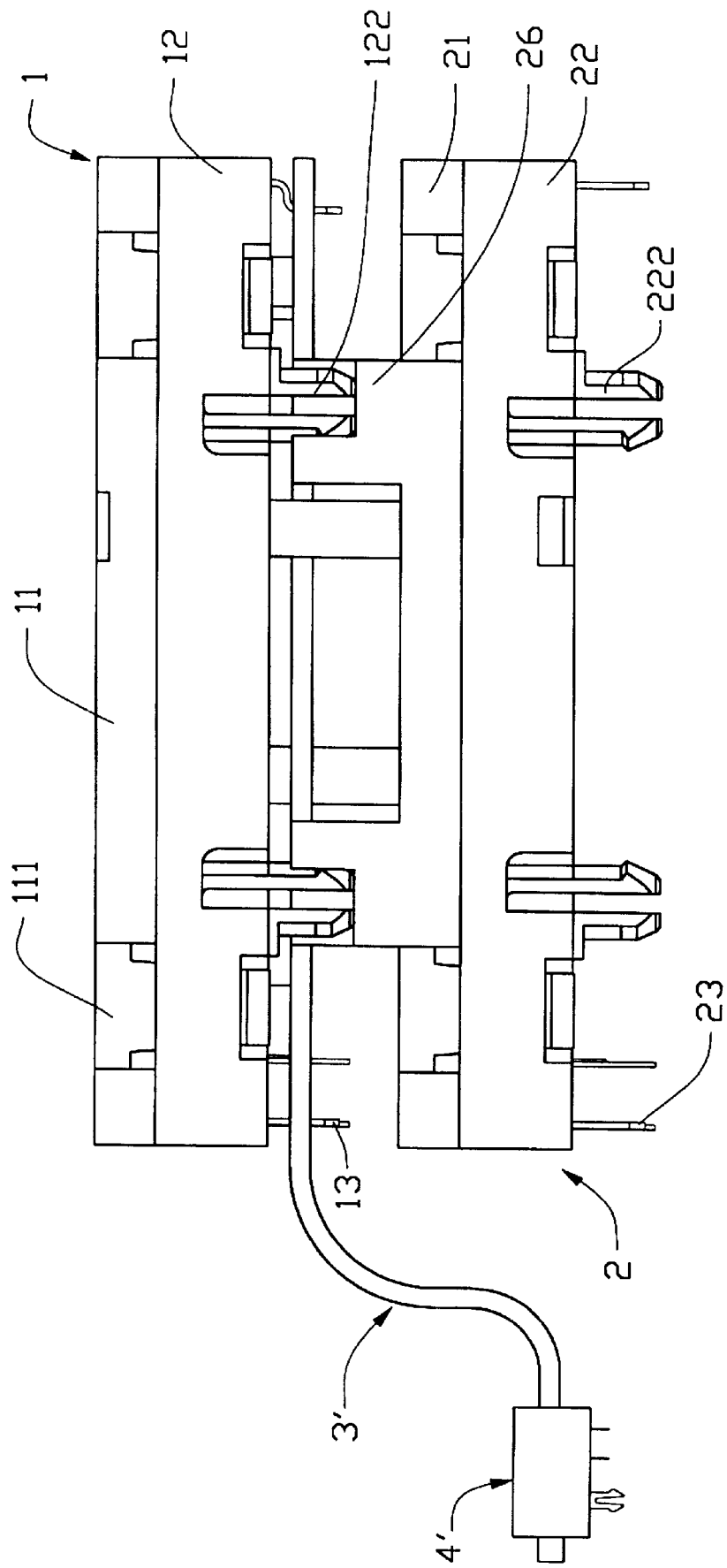
FIG. 5 is a right side view of a stacked smart card connector assembly in accordance with a second embodiment of the present invention.

Referring to FIG. 5, a second embodiment of the present invention is shown, wherein the upper connector 1 is connected to the mother board via a flexible printed circuit board 3' and a mating connector 4'. The flexible circuit board 3' extends from the upper connector 1 after engaging with the corresponding contacts 13 and is downwardly bent to engage the mating connector 4' mounted on the mother board thereby connecting the upper connector 1 to the mother board. The lower connector 2 is connected to the mother board in the same manner as the first embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A stacked smart card connector assembly for interconnecting two smart cards to a mother board, comprising:

an upper smart card connector and a lower smart card connector, each comprising a card receiving slot and a plurality of contacts, each contact comprising a solder portion extending from a bottom surface of the associated connector, the solder portions of the contacts of the lower connector being engaged with corresponding through holes of the mother board;

means for spacedly supporting the upper connector above the lower connector; and a transition device retained in a space between the upper and lower connectors and contacting the solder portions of the upper connector to electrically connect the upper connector to the mother board;

wherein the transition device comprises a circuit board and a header connector interconnected between the circuit board and the mother board.

2. A stacked smart card connector assembly for interconnecting two smart cards to a mother board, comprising:

an upper smart card connector and a lower smart card connector, each comprising a card receiving slot and a plurality of contacts, each contact comprising a solder portion extending from a bottom surface of the associated connector, the solder portions of the contacts of the lower connector being engaged with corresponding through holes of the mother board;

means for spacedly supporting the upper connector above the lower connector; and a transition device retained in a space between the upper and lower connectors and contacting the solder portions of the upper connector to electrically connect the upper connector to the mother board;

wherein the transition device comprises a flexible circuit board downwardly bent to connect to a mating connector mounted to the mother board.

3. The stacked smart card connector assembly as described in claim 1, wherein the supporting means comprises two pairs of protrusions respectively formed proximate opposite lateral sides of the lower connector, each protrusion forming a cavity in a corner thereof.

4. The stacked smart card connector assembly as described in claim 3, wherein the upper connector comprises two pairs of mounting posts extending from bottom sides thereof, the mounting posts being engageable with corresponding cavities of the protrusions of the lower connector.

5. The stacked smart card connector assembly as described in claim 1, wherein the lower connector comprises two pairs of mounting posts extending from bottom sides thereof, the mounting posts being adapted for being mounted to the mother board.

6. The stacked smart card connector assembly as described in claim 1, further comprising means for fastening the upper and lower connectors together.

7. The stacked smart card connector assembly as described in claim 6, wherein the fastening means comprises a pair of bolts extending through the upper and lower connectors.

8. The stacked smart card connector assembly as described in claim 7, wherein each connector comprises a locking hole disposed in each lateral side thereof proximate a mounting post for the extension of the bolt therethrough.

9. The stacked smart card connector assembly as described in claim 1, wherein each connector comprises a cover and a base attached together, the cover comprising a pair of opposite latch hooks downwardly extending from each lateral side thereof for engaging with a corresponding pair of holes disposed in each lateral side of the base, thereby attaching the cover to the base.

10. A stacked smart card connector assembly comprising:

an upper smart card connector and a lower smart card connector, each of said connectors comprising a card receiving slot and a plurality of contacts therein, each of said contacts defining a mounting portion extending downwardly from a bottom of surface the corresponding connector;

a significant space provided between said upper connector and said lower connector; and a transition device positioned in said space and electrically connecting to the mounting portion of the upper connector, said transition device including means laterally extending out of the space and toward the lower connector to electrically connect the upper connector to a circuit board on which the upper and lower connectors are to be placed.

* * * * *